May 30, 1961 C. D. FISHER 2,985,965
PELLET COOLER

Filed Feb. 28, 1957 3 Sheets-Sheet 1

INVENTOR.
CHESTER DONALD FISHER
BY
Green Maréchal, Jr.
ATTORNEY

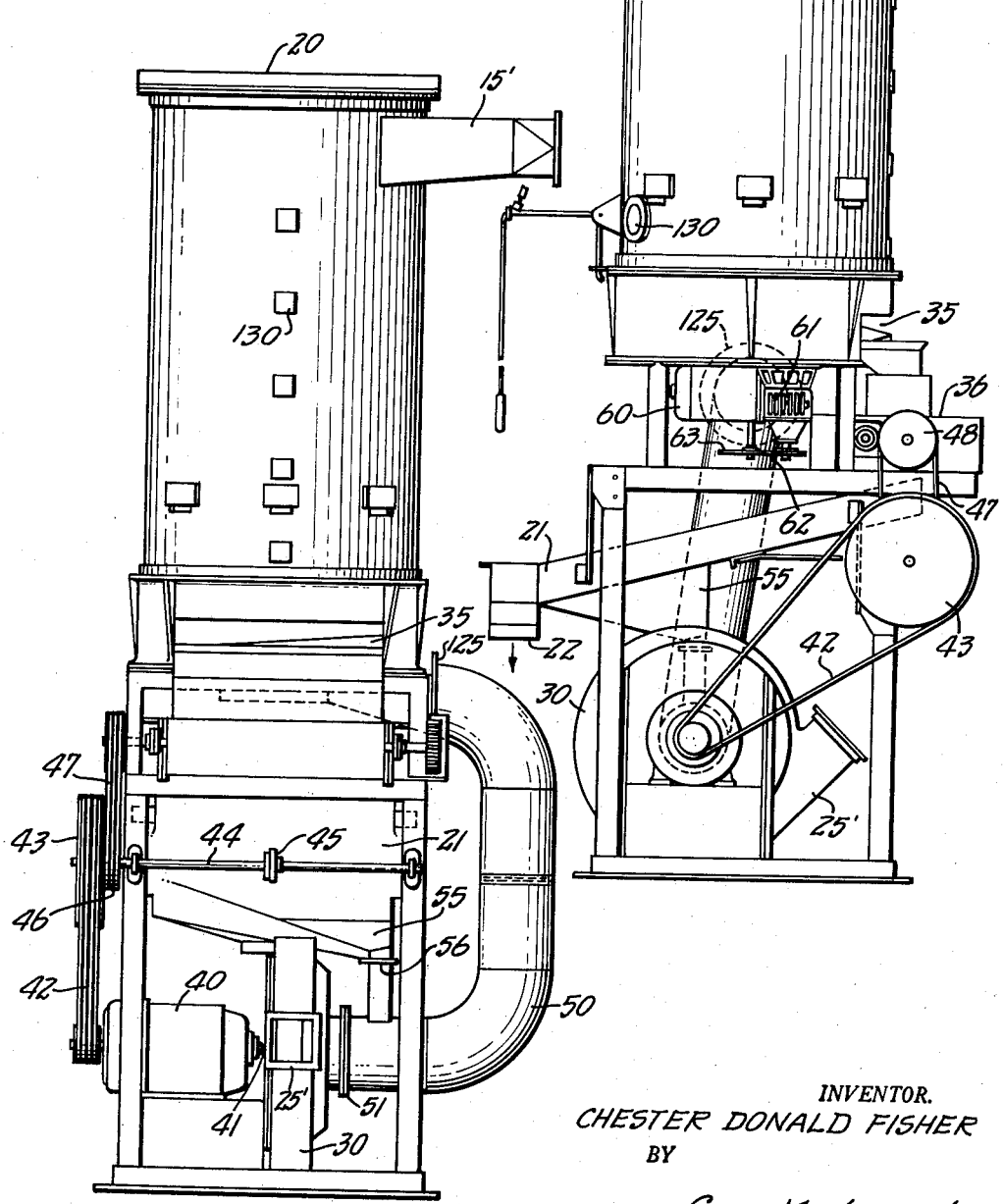

May 30, 1961  C. D. FISHER  2,985,965
PELLET COOLER
Filed Feb. 28, 1957
3 Sheets-Sheet 3

INVENTOR.
CHESTER DONALD FISHER
Greer Maréchal, Jr.
ATTORNEY

United States Patent Office 2,985,965
Patented May 30, 1961

2,985,965

PELLET COOLER

Chester Donald Fisher, Muncy, Pa., assignor to Sprout, Waldron & Company, Inc., Muncy, Pa., a corporation of Pennsylvania Filed Feb. 28, 1957, Ser. No. 643,013

12 Claims. (Cl. 34—57)

This invention relates to the pelleting of feeds and the like and, more particularly, to an arrangement for cooling, drying and handling pelleted materials after the pellets are formed in a pellet mill.

A number of feeds, such as alfalfa, chicken feed mashes, and the like, as well as other materials, are formed into pellets by feeding a compactible mash or mass of material to a pellet mill where it is compacted or extruded or otherwise formed into pellets. The formed pellets leaving the pellet mill may be hot and/or moist so that it is desired to cool and/or dry the pellets preparatory to the grading, sorting, and/or packaging thereof.

If it is attempted so to cool or dry the pellets by passing them downwardly through a cooling or drying tower, some means must be provided for raising the pellets from the pellet mill to the top of the tower, and it may be found that a mechanical conveyor presents certain problems incident to the heat and moisture of the pellets being conveyed and that a separate pneumatic conveyor of sufficient length and capacity to reach the top of a cooling tower is undesirably expensive to install or maintain. Also it may be found that adequate cooling can be achieved with a cooling tower only if the tower is undesirably high for ready installation in existing buildings in order to achieve a sufficient dwell or contact time of the pellets in the tower.

If it is attempted to use a shorter tower of greater cross-section, instead of a tall tower of smaller cross-section, it may be found that the pellets fall downwardly through the tower at a greater rate or in a non-uniform manner producing inadequate or non-uniform cooling or drying thereof.

According to the invention, however, a compact cooling and conveying system for handling the pellets from a pellet mill is provided with a comparatively short cooling tower of adequate capacity having a rotating basket and feeding means providing adequately uniform feeding of the pellets therethrough and adequate cooling and drying of the pellets therein.

One object of this invention is to provide an apparatus for handling, conveying, grading, cooling, and drying pellets from a pellet mill in such an arrangement that the handling, conveying, and cooling of the pellets is accomplished by a single pneumatic train or air stream.

Another object of this invention is to provide an arrangement of apparatus of the character described in a single compact unit for continuously handling, treating, and completing the various required operations on newly formed pellets after leaving the pellet mill.

A further object of this invention is to provide a rotating pneumatic pellet cooler of relatively low height and large capacity including rotating screen and feeding elements for uniformly feeding pellets therethrough and for controlling the dwell or contact time of pellets therein.

Still another object of this invention is to provide a substantially cylindrical pellet cooler of the character described having a diameter larger than would assure uniform feeding of pellets therethrough and means for controlling the feeding of pellets therethrough to provide uniform feeding and cooling and dwell of pellets therein.

A still further object of this invention is to provide a rotating pneumatic pellet cooler and drier of the character described having discharge means for automatically discharging pellets therefrom after a predetermined dwell period therein, the interior of the cooler in operation being at reduced air pressure and with means arranged to discharge pellets from the cooler to the atmosphere without allowing passage of air pressure back into the reduced pressure interior of the cooler.

Still another object of this invention is to provide an arrangement of apparatus of the character described for handling, conveying, grading, cooling, and drying pellets from a pellet mill, and being substantially free of mechanical conveying equipment and embodying an integrated arrangement rather than separately operated individual components arranged sequentially for non-integrated operation.

Still a further object of this invention is to provide apparatus of the character described in a single integrated unit for continuously handling, treating, and completing the various required operations on newly formed pellets after leaving a pellet mill, and including a single pneumatic train or air stream for handling and cooling the pellets and a rotating pneumatic pellet cooler having automatic feeding means for cooling and drying the pellets.

Other objects and advantages of this invention will be apparent from the following description, the accompanying drawings and the appended claims.

In the drawings—

Fig. 2 is an end view in elevation of a conveying, grading, cooling, and drying unit embodying this invention;

Fig. 3 is a side elevational view of the unit of Fig. 2;

Figure 1:
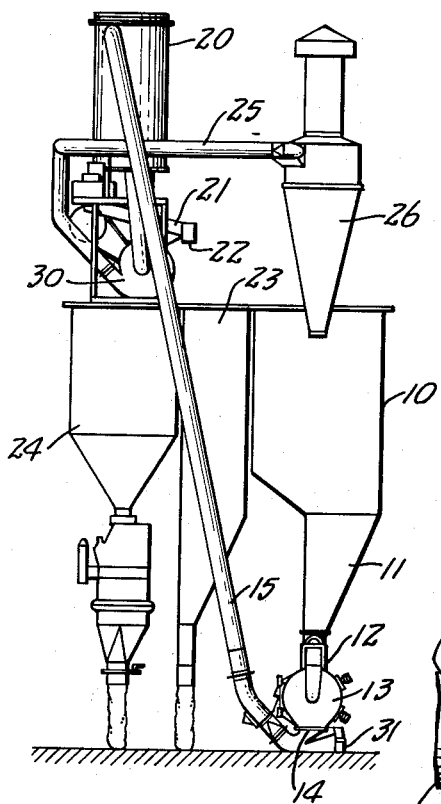
Fig. 1 is a view in elevation showing a complete pelleting arrangement embodying this invention.

Referring to the drawings, in which like reference characters refer to like parts throughout the several views thereof, a complete arrangement for pelleting, for example, a mash of animal feed is indicated generally and somewhat diagrammatically in Fig. 1 as including a mash bin 10 for storing the mash to be pelleted and having a feed chute 11 leading to the inlet 12 of pellet mill 13. Pellet mill 13 may be any conventional type of apparatus for forming compacted or extruded pellets as, for example, shown in the patents to Thompson, No. 2,306,145, December 22, 1942, or Fisher, No. 2,764,951, October 2, 1956.

The pellets as formed by pellet mill 13 are discharged therefrom at outlet 14 where they are entrained in a high velocity air stream and pneumatically conveyed through duct 15 up to the top of cooling and drying apparatus indicated generally at 20. As described below in more detail, the pellets are fed downwardly through cooling and drying apparatus 20 where they are subjected to the cooling and drying action of air from the air stream which pneumatically conveys them to the cooler 20, and are discharged from the bottom of cooler 20 to a grading and sorting screen 21 where the pellets are sorted or graded as to size. The accepted pellets are discharged from grading screen 21 at the outlet 22 thereof and are preferably directed selectively either into pellet storage bin 23 or an automatic scale and sacking device indicated generally at 24. The fines, which are separated from the pellets by grading screen 21 and during the passage of the pellets through cooling and drying unit 20, are collected and entrained in the air being exhausted from cooler 20 and pneumatically conveyed through duct 25 to a cyclone separator 26 from which the fines are returned to mash bin 10 to be fed to pellet mill 13 to make pellets.

The entire pneumatic power for conveying the finished pellets through duct 15 to the cooling and drying device 20, cooling and drying air, and for collecting the fines and returning them to the mash bin 10 is all supplied by a single blower 30 as described more in detail hereafter. The required air stream is drawn into the system at air inlet 31, entrains the pellets at the outlet 14 of pellet mill 13 and conveys them through duct 15 to cooling and drying unit 20. This same air stream then provides cooling and drying unit 20 from which it is withdrawn by blower 30 and, along with the fines, conducted to separator 26 through duct 25. The fines are separated from the entrained air in 26 and the air is exhausted therefrom.

A single compact unit for collecting, conveying, cooling, drying, and grading the pellets in a system as just explained is shown in more detail in Figs. 2 and 3. Referring to these figures, a generally cylindrical cooling and drying unit is shown at 20. The pellets, entrained in an air stream, enter the top of unit 20 through inlet 15' from duct 15 and pass downwardly through unit 20 to the outlet 35 thereof where they fall into a conventional crumbles roll device indicated generally at 36 and, thence, on to a conventional vibrating screen or grading shoe 21 where the pellets are sorted or graded as to size with fines being separated from accepted pellets by screen 21. The design and construction of the crumbles roll device 36 and grading mechanism 21 are well-known and need not here be described in detail. The accepted pellets from screen 21 are discharged from the outlet 22 thereof and, as previously noted, directed to storage bins, packaging machines, or otherwise.

A single motor 40 drives blower 30 through shaft 41 to provide the pneumatic power for the entire system, and also provides the power for vibrating or oscillating screen 21 through belts 42, driving a pulley 43 mounted on shaft 44, on which is also mounted an eccentric shaker drive 45 for oscillating or vibrating screen 21 in known manner. Shaft 44 also carries drive pulley 46 which, through belts 47 and pulley 48, drives the crumbles roll unit 36 in known manner.

Blower 30 provides air for the entire system, as noted. A duct 50 leads from the bottom air outlet of pellet cooler 20 to the suction side of blower 30, and through this duct 50 blower 30 sucks air out of pellet cooler 20 and, accordingly, establishes the air stream in duct 15 leading to top air inlet 15' of cooler 20 for conveying the pellets to cooler 20. The discharge side of blower 30, indicated at Figs. 2 and 3 at 25', connects to duct 25 and forces air therethrough into separator 26. The fines, separated from accepted pellets at screen 21, are collected in the lower portion 55 thereof and are fed through the fines discharge 56 into duct 50 before it engages the suction inlet 51 of blower 30, thereby entraining fines in the air stream entering the suction side of blower 30, from which they are pneumatically conveyed by the pressure discharge 25' of blower 30 and through duct 25 to separator 26 as noted. Additional fines or dust may be separated from the pellets in cooling and drying unit 20, and, as will be explained later, these leave cooler 20 through the bottom air outlet thereof entrained in the air stream being drawn through duct 50 by blower 30. An additional motor 60 drives the rotating inner basket and screen portion of cooling and drying unit 20, hereinafter referred to, through a gearing unit 61 and chain and sprocket drive indicated at 62, 63.

As illustrated in more detail in Fig. 4–9, cooling and drying unit 20 comprises a generally cylindrical outer wall 70 having a top plate 71 and a base plate 72. A shaft 75 is axially mounted through cooler 20 for rotation therein by top and bottom journals and bearings 76 and 77, and a sprocket wheel 63 is mounted on the bottom end of shaft 75 for engagement with the drive 61, 62 from motor 60.

The interior of cylindrical cooler 20 is transversely subdivided a short distance above base plate 72 by a transverse partition 80 having a circular opening 81 centrally thereof and another opening 85 at one side thereof for the passage of pellets therethrough. Opening 85 is controlled by a gate or slide 86 mounted so that opening 85 may be selectively closed or opened by the movement of a bellcrank 87 pivoted at 88 on a bracket 89 affixed to the outside wall 70 of cooler 20 as indicated in dotted and full line, respectively, in Fig. 4.

Figure 5:
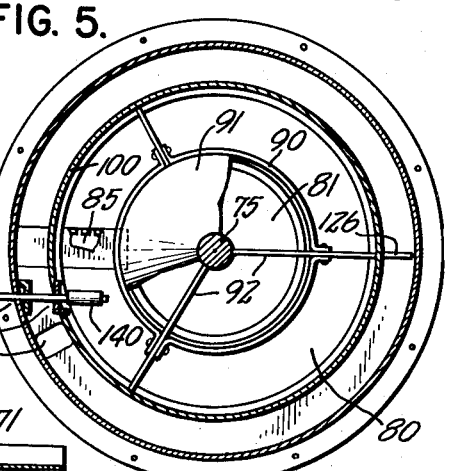
Fig. 5 is a transverse section along the line 5—5 of Fig. 4.

Mounted on shaft 75 for rotation therewith above partition 80 is a cylindrical wire mesh screen member 90 having a conical sheet metal top 91. As indicated in Fig. 5, this cylindrical screen 90 may satisfactorily be mounted on shaft 75 by a plurality of radially extending webs or straps 92 welded to shaft 75 at the top and bottom of cylindrical screen 90. Otherwise, the bottom end of screen 90 is open and engages and substantially coincides with the circular opening 81 in transverse partition 80.

Also mounted on shaft 75 for rotation therewith above transverse partition 80 is a foraminous basket member 100 connected to shaft 75 as by top and bottom straps 92. Basket member 100 is generally cylindrical, although the sides thereof are somewhat tapered so that the top diameter is slightly less than the bottom diameter, and, as indicated particularly in Fig. 4, basket 100 extends axially somewhat above the top of screen member 90. Fixedly mounted adjacent the top of cooler 20 is a generally circular separator 105 the vertical sides of which extend slightly below the top of basket member 100 and the diameter of which is slightly less than the top diameter of basket member 100.

Figure 6:
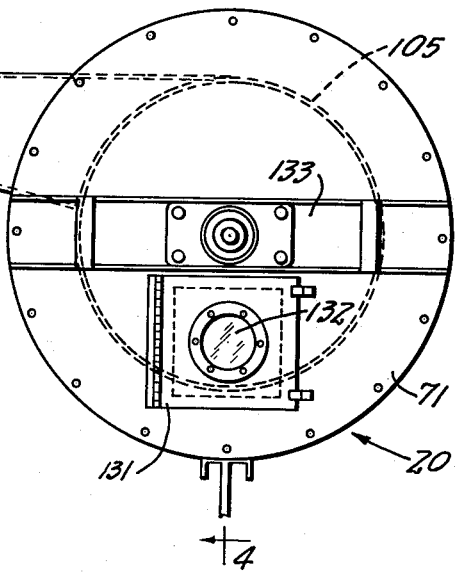
Fig. 6 is a top plan view of the apparatus of Fig. 4.
Figure 7:
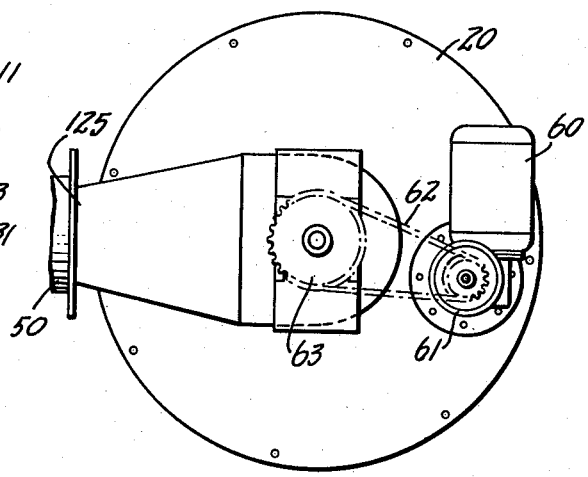
Fig. 7 is a bottom plan view of the apparatus of Fig. 4.
Figure 9:
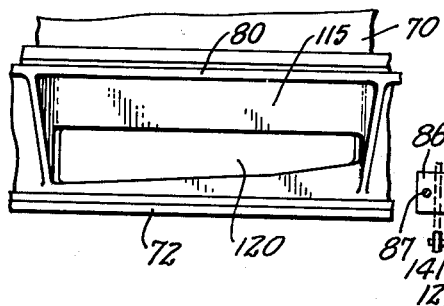
Fig. 9 is a detail view along the line 9—9 of Fig. 4.
Figure 4:
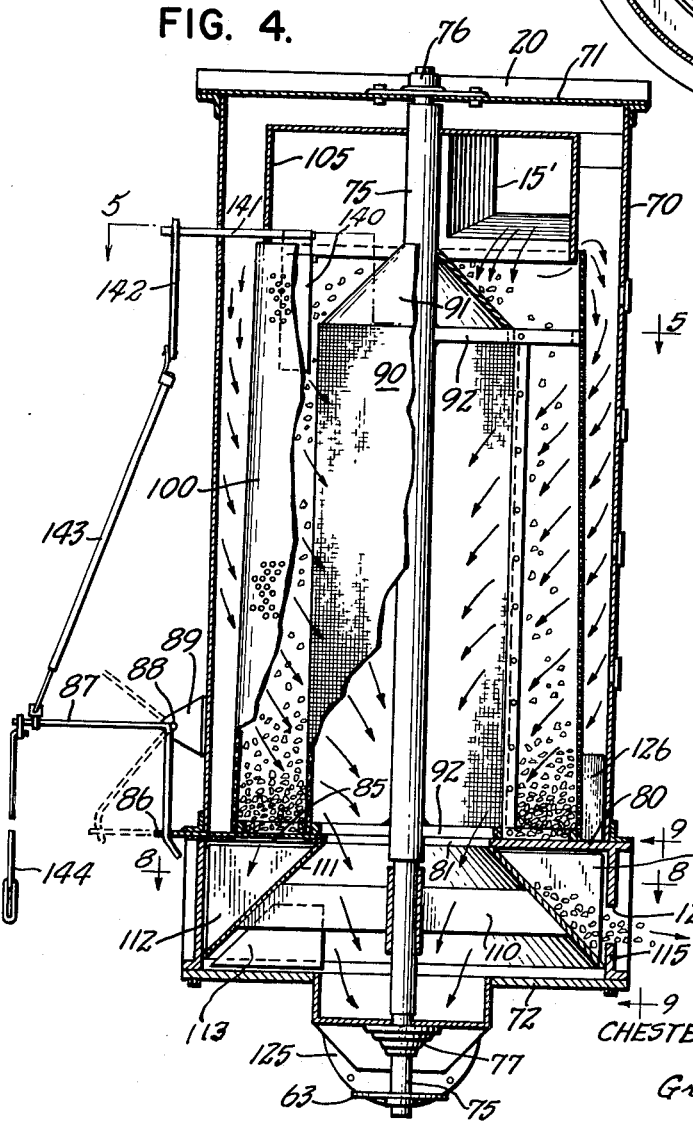
Fig. 4 is a vertical section of pellet cooling and drying apparatus embodying this invention along the line 4—4 of Fig. 6.

As indicated more particularly in Fig. 6, the inlet 15', for connection with duct 15 from pellet mill 13, enters the outer wall 70 of cooler 20 adjacent the top thereof and connects tangentially with member 105 to give a cyclone separating action to the pellets being introduced to cooler 20 entrained in air from duct 15. That is, the pellets entrained in an air stream are conveyed up through duct 15 and through inlet 15' into cooler 20 and within the circular member 105 thereof where the pellets are separated from the entraining air and dropped downwardly into basket 100 around cylindrical screen 90, as indicated in Fig. 4, while the air flows around the outside of basket 100 and is drawn through the perforations thereof, through the pellets contained in them therein, and through cylindrical screen 90 by the action of blower 30.

Figure 8:
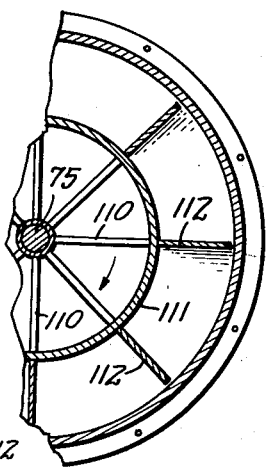
Fig. 8 is a fragmentary transverse sectional view along the line 8—8 of Fig. 4.

Below transverse partition 80 is a rotating paddle wheel feeder and air lock arrangement also mounted on shaft 75 and comprising radial spokes 110 carrying a frustoconical hollow sheet metal member 111 outwardly from which extend substantially triangular paddles 112. The top of the hollow frustro-conical member 111 is open and of a size to coincide substantially with the central circular opening in transverse partition 80, while paddles 112, as particularly indicated in Figs. 4 and 8, are arranged to fill the cross-section of the space in the cooling tower between transverse partition 80 and base plate 72. As the paddle wheel feeder arrangement 110–112 is rotated by shaft 75, pellets fall from above transverse partition 80 through the opening 85, upon opening gate 86 thereover, and are received sequentially into the various pockets between paddles 112, which carry the pellets thus received around to discharge opening 120 in the side wall of cooling tower 20 substantially diametrically opposed to the position of opening 85 in transverse partition 80. A wiper blade 113 is preferably provided on one of the spokes 110 to wipe any dust collecting on transverse partition 72 out through the central opening therein.

It will be noted that this action of the paddle wheel feeder 110–112 acts as an air seal during discharge of the pellets. Since the interior of the cooler 20 is under reduced pressure by virtue of the suction action of blower 30, the paddle wheel feeder arrangement acts as a rotary valve to withdraw pellets from above transverse partition 80 and discharge them to the atmosphere through discharge opening 120 while sealing against air flow through opening 85 into the portion of cooler 20 above transverse partition 80. As indicated more particularly in Fig. 9, discharge opening 120 is somewhat wedge-shaped and of varying height according to the direction of rotation of paddle wheel feeder 110–112 to provide for continuous and ready sweeping discharge of pellets outwardly through opening 120 as the paddles 112 rotate therepast.

As previously noted, the air stream carrying pellets into cooler 20 through duct 15 and inlet 15' is separated from the pellets by the circular separator 105 with the pellets dropping into basket 100 and outside of central column 90. The air stream itself goes outside basket 100 and is drawn inwardly through the perforations thereof, through the pellets within basket 100, and into the central mesh column 90. From here the air is drawn downwardly through opening 81 in transverse partition 80, through the central hollow portion of paddle wheel feeder 110–112, and out through the bottom air outlet 125 from tower 20, to which outlet duct 50 is connected leading to the suction side of blower 30.

Any fines or dust which may be separated from the pellets in rotating basket 100 and carried by the air stream through the mesh of central column 90 are also carried to the suction side of blower 30 through air outlet 125 and duct 50. Other fines or dust which may fall outwardly of rotating basket 100 through the perforations in the sides thereof collect in the space between basket 100 and outer wall 70 of cooler 20, where they are collected and conducted by a paddle or baffle 126 affixed to the outside of basket 100 adjacent the bottom thereof and swept or conducted to a discharge opening 127 adjacent the pellet discharge 85. The fines fall through this opening 127 in transverse partition 80 down between the paddles 112 and are discharged out the pellet discharge 120 into screen 21 which separates these fines from accepted pellets. All the fines from screen 21, as previously noted, pass out the fine discharge 56 and into duct 50 to be entrained in the air stream therein by blower 30.

For convenience, a plurality of access and/or observation openings 130 are provided in the outside wall 70 of cooler 20, and an access door 131, including an observation port 132, is preferably provided in the top 71 of cooler 20. For convenience in installation, hoisting, shipping, etc., a reinforcing beam 133 may also be provided across the top of cooler 20.

The sliding gate 86 for opening and closing opening 85 in transverse partition 80 is preferably automatically operated by a baffle member 140 pivotally mounted in the top portion of cooler 20 at 141 and connected through a linkage 142 to a cable linkage 143. By this arrangement, the gate 86 is automatically opened as the space between basket 100 and central column 90 fills with pellets by the pellets therein impinging on baffle 140, and gate 86 is maintained open so long as the pellets are at a desired level in cooler 20. This arrangement provides automatically for discharging pellets from the bottom of cooler 20 at approximately the same rate at which they enter the inlet 15' thereof to maintain substantially uniform dwell and automatic control of passage of pellets through the cooler 20. A depending handle 144 on bell crank 87 provides for manually opening or closing gate 86 for manual control of pellet discharge from cooler 20.

It will, accordingly, be seen that apparatus is provided for the complete handling, sorting, drying, cooling, conveying, and packaging or storing of pellets formed in pellet mill 13 in a unitary device of fairly limited height and utilizing a pneumatic conveying system from a single air stream accomplishing the functions of conveying, distributing, cooling and drying, as well as various apparatus all driven from a single source or motor. Furthermore, the foregoing is accomplished with most of the apparatus in a self-contained unitary structure of a height and size which can readily be installed in a one story building and providing, particularly with the pellet cooler and drier, a controlled and uniform dwell and throughput of adequate productive capacity yet contained within compact space.

While the methods and forms of apparatus herein described constitute a preferred embodiment of the invention, it is to be understood that the invention is not limited to these precise forms of apparatus, and that changes may be made therein without departing from the scope of the invention which is defined in the appended claims.

What is claimed is:

1. In a system for making, processing, cooling, drying, conveying, sorting, and storing pellets and having a pellet mill for forming said pellets and a supply container for material to be pelleted in said mill, the combination which comprises a pellet cooling and drying device having an outer enclosing casing for subjecting pellets delivered thereto to the cooling and drying action of a stream of air, sorting means for receiving pellets from said cooling and drying device and for sorting said pellets into acceptable pellets and fines, a first pneumatic conveying means communicating with said casing for conveying pellets from said pellet mill to said cooling and drying device, second conveying means for conveying fines from said sorting means to said supply container for material to be pelleted, and means for supplying high velocity air sequentially through said first pneumatic conveying means, said cooling and drying device and said second pneumatic conveying means.

2. Apparatus for handling, conveying, cooling, drying, and sorting pellets from the pellet mill, comprising in combination a casing, pellet cooling and drying means within said casing, pneumatic conveying means for conveying pellets to the interior of said casing, separating means within said casing and communicating with said conveying means for separating said pellets from the air stream of said pneumatic conveying means, whereby said air stream serves to cool and dry the pellets within said casing, sorting means at the bottom of said device for receiving pellets from the said cooling and drying means and grading them into accepted pellets and fines, and means for supplying high velocity air sequentially through said pneumatic conveying means and said casing.

3. Apparatus for handling, conveying, cooling, drying, and sorting pellets from a pellet mill comprising in combination a cooling and drying unit including a casing for subjecting pellets from said mill to the cooling and drying action of an air stream, first pneumatic conveying means communicating with said casing for conveying said pellets to the top of said cooling and drying unit, sorting means at the bottom of said unit for receiving pellets from said cooling and drying device and grading them into accepted pellets and fines, second pneumatic conveying means communicating with said casing for collecting and conveying away fines from said sorting means, and means for supplying high velocity air sequentially through said first pneumatic conveying means, said cooling and drying means and said second pneumatic conveying means, and means within said casing for separating said pellets from said pneumatic conveying means in said cooling and drying unit whereby said air stream from said cooling and drying unit is provided by the air stream of said pneumatic conveying means after said pellets have been separated therefrom.

4. Rotary pellet cooling and drying apparatus of the character described comprising in combination a closed casing having a material and air inlet and including a rotating substantially cylindrical foraminous basket for receiving pellets to be cooled and dried therein, a centrally disposed screened column concentrically mounted in said basket, pneumatic conveying means for feeding pellets into the top of said casing, separator means within said casing, including a tangential separator for feeding said pellets into the top of said basket and outside said screened column and forcing the air stream outside said basket, means for drawing a stream of cooling and drying air through said pneumatic conveying means, said separator means, and from outside said basket through said foraminous walls thereof and through pellets contained therein into said screened central column, and means for rotating said basket and pellets therein for uniform cooling and drying thereof by said air stream.

5. Rotary pellet cooling and drying apparatus of the character described comprising in combination a closed casing having a material and air inlet and including a rotating substantially cylindrical vertically disposed foraminous basket for receiving pellets to be cooled and dried therein, a centrally disposed screened column concentrically mounted in said basket, pneumatic means communicating with said material and air inlet for feeding pellets into the top of said basket in said casing and outside said screened column and forcing the air outside said basket, means for drawing a stream of cooling and drying air through said pneumatic means, said inlet, and from outside said basket through said foraminous walls thereof and through pellets contained therein into said screened central column, means for rotating said basket and pellets therein for uniform cooling and drying thereof, and means for withdrawing pellets from said rotating basket, said withdrawing means including airlock means for maintaining in said closed casing an air pressure differential with respect to the atmosphere.

6. Rotating pellet cooling and drying apparatus of the character described comprising in combination a closed casing having a material and air inlet and including a rotating substantially cylindrical vertically disposed foraminous basket for receiving pellets to be cooled and dried therein, pneumatic means communicating with said casing for delivering pellets to the top of said basket and for separating said pellets for deposit in said basket from said pneumatic conveying means and forcing air outside said basket, a centrally disposed screened column concentrically mounted in said basket, means communicating with the interior of said screened column for drawing a stream of cooling and drying air through said pneumatic conveying means, said inlet, and from outside said basket through said foraminous walls thereof and through pellets contained therein into said screened central column, means for rotating said basket and said pellets therein for uniform cooling and drying thereof, and means for withdrawing pellets from said rotating basket at a controlled rate correlated with the rate of feeding pellets into the top of said basket, said withdrawing means including airlock means for maintaining in said closed casing an air pressure differential with respect to the atmosphere.

7. Rotary pellet cooling and drying apparatus as defined in claim 6 in which said pneumatic means for separating said pellets includes a tangential separator.

8. Rotary pellet cooling and drying apparatus of the character described comprising in combination a closed casing having a material and air inlet adjacent the top thereof and a material outlet adjacent the bottom thereof, a rotating substantially cylindrical foraminous basket within said casing for receiving pellets to be cooled and dried therein, a centrally disposed screened column mounted in said basket, separator means within said casing and in communication with said material and air inlet for feeding pellets into the top of said basket and outside said screened column and forcing air outside said basket, means communicating with the interior of said screened column for drawing cooling and drying air through said material and air inlet, said separator means, and from outside said basket through foraminous walls thereof and through pellets contained therein into said screened column, means for rotating said basket within said casing for uniform cooling and drying of said pellets in said stream of air, and rotary paddle wheel airlock means in said casing below said basket and adjacent said material outlet for withdrawing pellets from said rotating basket at a controlled rate and delivering said pellets out of said material outlet while preventing passage of air through said airlock means.

9. Rotary pellet cooling and drying apparatus as defined in claim 8 in which said separator means comprises a cyclone separator.

10. Rotary pellet cooling and drying apparatus of the character described comprising in combination a closed casing having a material and air inlet and a material outlet, a rotating substantially cylindrical foraminous basket in said casing for receiving pellets to be cooled and dried therein, a centrally disposed screened column concentrically mounted in said basket, separator means communicating with said material and air inlet for separating pellets conveyed in the said casing in the air stream of a pneumatic conveying system and for feeding said pellets into the top of said basket and outside said screened column and forcing the air outside the basket, means communicating with the interior of said screened column for drawing a stream of cooling and drying air from outside said basket through said foraminous walls thereof and through pellets contained therein into said screened central column, means for rotating said basket and pellets therein for uniform cooling and drying thereof in said stream of air, rotary paddle wheel airlock means beneath said basket and within said casing adjacent said material outlet for withdrawing pellets from said rotating basket at a controlled rate for delivery to said material outlet while preventing passage of air through said airlock means, and means in said casing outside said basket for collecting and withdrawing from said casing fines and undersize pellets which may escape through said foraminous walls of said rotating basket.

11. Rotary pellet cooling and drying apparatus of the character described comprising in combination a closed casing having a material and air inlet, a rotating foraminous basket within said casing for receiving pellets to be cooled and dried therein, a centrally disposed screened column concentrically mounted in said basket, pneumatic conveying means communicating with said casing through said material and air inlet for entraining pellets in an air stream, separator means adjacent and in communication with said inlet for separating said pellets from said air stream and for feeding said pellets into the top of said basket and outside said screened column and forcing the air outside said basket, means communicating with the interior of said screened column for drawing a stream of cooling and drying air through said conveying means, inlet, separator and from outside said basket through said foraminous walls thereof and through pellets contained therein into said screened column, and means for rotating said basket and pellets therein for uniform cooling and drying thereof.

12. Apparatus of the character described for the handling, conveying, cooling, and drying of pellets from a pellet mill comprising in combination a casing having a material and air inlet, cooling and drying means within said casing for subjecting pellets from said mill to the cooling and drying action of an air stream, pneumatic conveying means communicating with said casing through said inlet for conveying said pellets entrained in a stream of air to the top of said cooling and drying means, means within said casing for separating said pellets from said stream of air, means for subjecting said pellets in said cooling and drying means to the cooling and drying action of said separated stream of air circulated through said pellets, means for withdrawing pellets from the bottom of said casing while maintaining said circulation of said stream of air through said casing, and blower and duct means for supplying a stream of air sequentially through said pneumatic conveying means and said cooling and drying means.

References Cited in the file of this patent

UNITED STATES PATENTS

| | | |
|---|---|---|
| 255,564 | Barclay | Mar. 28, 1882 |
| 759,527 | Irwin | May 10, 1904 |
| 1,039,449 | Scott | Sept. 24, 1912 |
| 2,657,797 | Ledgett et al. | Nov. 3, 1953 |
| 2,733,521 | Zollman | Feb. 7, 1956 |
| 2,772,642 | Lindl | Dec. 4, 1956 |

FOREIGN PATENTS

| | | |
|---|---|---|
| 640,773 | Germany | Jan. 12, 1937 |